Patented Mar. 7, 1944

2,343,254

UNITED STATES PATENT OFFICE 2,343,254

PROCESS FOR RECOVERING RIBOFLAVIN FROM ADSORBATES

Julian K. Dale, Terre Haute, Ind., assignor to Commercial Solvents Corporation, Terre Haute, Ind., a corporation of Maryland No Drawing. Application August 2, 1940, Serial No. 350,113

8 Claims. (Cl. 167—81)

My invention relates to a process for the recovery of flavin from inorganic adsorbents on which said flavin has been adsorbed.

Flavin, otherwise known as riboflavin, lactoflavin, vitamin G, or vitamin $B_2$, has been obtained in relatively concentrated form from various sources, such as liver, yeast, skimmed milk, whey, specially-treated skimmed milk and whey, as, for example, the products described in U. S. Pat. 2,128,845, of Myers et al., U. S. Pat. 2,006,699 of Supplee et al., and from fermentation residues such as the butyl fermentation residues described in U. S. Pat. 2,202,161, of Carl S. Miner. In obtaining flavin concentrates of high potency from any of these sources, it has been a common practice to adsorb the flavin on an inorganic adsorbent, such as fuller's earth, kieselguhr, kaolin, ascanite, silica gel, hydrated aluminum silicate, etc. The flavin is then recovered from the resulting adsorbate by desorbing or eluting with an elution solvent.

Various solvents have been recommended in the past as eluting agents for this purpose. Inorganic acids, alkalies, and salts in aqueous or alcoholic solution have been used, as well as organic acids and bases. The organic bases, and especially pyridine, have been most commonly employed, but all of these solvents have had numerous disadvantages. Pyridine, for example, is disadvantageous from the standpoint of cost, odor, and variability of results when extracting different adsorbates with this solvent. Most of the elution solvents previously employed have also been disadvantageous from the standpoint of extracting from the adsorbate relatively large amounts of impurities, as well as the flavin itself.

I have now found that the lower polyhydric alcohols, and the partially-etherified lower polyhydric alcohols, constitute excellent solvents for the elution of flavin from inorganic adsorbates. Any of the lower polyhydric alcohols, or partially-etherified lower polyhydric alcohols, may be employed for this purpose, but I prefer to employ polyhydric alcohols containing from 2 to 4 carbon atoms, and such polyhydric alcohols partially etherified by monohydric or polyhydric alcohols containing from 2 to 4 carbon atoms. Among these may be mentioned ethylene glycol, propylene glycol, trimethylene glycol, $\alpha$-butylene glycol, $\beta$-butylene glycol, glycerol, diethylene glycol, the monomethyl ether of ethylene glycol, the monoethyl ether of ethylene glycol, the monomethyl ether of diethylene glycol, the monoethyl ether of diethylene glycol, and the various monomethyl, monoethyl, dimethyl, and diethyl ethers of glycerol. I prefer to employ the lower molecular weight compounds of the above type, since they have lower viscosities and lower boiling points, thus facilitating the separation of the eluate from the adsorbent and the recovery of flavin from the eluate. The lower molecular weight compounds are also desirable because in any homologous series of these compounds, the solvent power for flavin elution apparently increases with decreasing molecular weight.

The elution solvent of the above class may be employed alone, or may be used in conjunction with other solvents, or diluents. Mixtures of these eluting solvents with other known flavin eluting agents will be found to be satisfactory, but in general I prefer to employ mixtures of these solvents with water, or with organic solvents which are not per se elution solvents for flavin. Among the latter, I prefer to use the lower monohydric alcohols, and lower aliphatic ketones. Some of these materials, and especially water and the lower monohydric alcohols, appear to increase the eluting power of the polyhydric alcohols, or partially-etherified polyhydric alcohols. This is particularly true if the water or monohydric alcohol does not greatly predominate in the solvent mixture. For this reason I usually prefer to employ my new solvents in conjunction with not more than twice the volume, and preferably an equal volume or less, of water or of a monohydric alcohol containing from 1 to 4 carbon atoms.

The amount of elution solvent to be employed is not critical, and may vary within relatively wide limits. In general, however, I prefer to use from 5 to 10 milliliters of elution solvent per gram of adsorbate. From an economic standpoint it is desirable to employ the minimum quantity of solvent which will result in elution of the maximum amount of flavin under the elution conditions employed. This can, of course, be determined easily by preliminary experiments.

The elution, by means of my new solvents or solvent mixtures, may be effected at ordinary room temperature, or at elevated temperatures. With the more active elution solvents, temperatures below ordinary room temperatures may be employed, but there is no apparent advantage in such a procedure which would warrant the expense of refrigeration. Temperatures above normal atmospheric temperature usually result in more complete elution of the flavin by a given volume of solvent. Super-atmospheric temperatures are particularly desirable when employing the less-powerful elution solvents, or solvent mixtures. Any temperature which is not sufficiently high to cause destruction of flavin, or interfere with its subsequent recovery, may be employed for the elution process. In general, however, I prefer to employ temperatures of 100° C., or below.

My elution process is applicable to the elution of flavin from adsorbates prepared from any of the inorganic flavin adsorbents. However, my process is particularly applicable to the elution of flavin from fuller's earth adsorbates, and I prefer to use adsorbates of this type. If the adsorbates have been prepared from crude sources of flavin, such as those previously mentioned, it is usually desirable to wash the adsorbate thoroughly, prior to elution, in order to minimize the amount of impurities dissolved by the elution solvent. For this purpose the adsorbate may be washed with water or with any inorganic solution or organic solvent, or solvent mixture which is not a flavin-elution solvent, and which is not injurious to the flavin. Thorough washing with water, is usually quite satisfactory. It should be understood, however, that my process is also useful for eluting crude adsorbates which have not been washed, or otherwise treated.

The elution by means of my new solvents or solvent mixtures, may be carried out in accordance with practices which have previously been used with other elution solvents. Thorough contact of the elution solvent with the adsorbate should be provided, preferably by mechanical agitation during the elution. The time required for the elution will, of course, vary with the conditions employed. Thus, the elution is usually more rapid at elevated temperatures, than at atmospheric temperature. A time of one hour at ordinary atmospheric temperatures, or of one-half hour at 100° C., will usually be found to be satisfactory. At the conclusion of the elution, the adsorbent may be removed by any suitable means, as, for example, by decantation, gravity filtration, vacuum filtration, centrifuging, or the like. If a batch extraction method has been employed, the adsorbent may desirably be washed with a further portion of the elution solvent. However, if the elution has been carried out by continuous or countercurrent extraction, this final washing of the adsorbent will usually be unnecessary.

The solution of flavin in the elution solvent, obtained as described above, may be used as such, to supply flavin for its various uses in the arts, or the elution solvent may be separated from the dissolved solids by vacuum distillation, or other suitable procedures, to obtain a flavin concentrate of high potency.

My invention may be further illustrated by the following specific examples:

EXAMPLE I

A fuller's earth adsorbate, prepared from a fermentation residue, was thoroughly washed with water, dried, and assayed for flavin. The material was found to contain approximately 6,650 micrograms of flavin per gram. Separate portions of this adsorbate were agitated for one hour at room temperature, with ethylene glycol and with various ethylene glycol-water mixtures. In each case the elution solvent, or solvent mixture, was employed in a proportion of 1 liter per 100 grams of adsorbate. At the conclusion of the elution, the adsorbent was removed by filtration, and the resulting solution was assayed for flavin. The percentage elution, obtained in each case, is shown in the table below:

Table I

| Elution solvent | Elution |
|---|---|
| | Per cent |
| 100% ethylene glycol | 85 |
| 67% ethylene glycol, 33% water | 93 |
| 50% ethylene glycol, 50% water | 35 |
| 33% ethylene glycol, 67% water | 2 |

EXAMPLE II

Various portions of the adsorbate, used in Example I, were agitated at room temperature for one hour with ethylene glycol, and with solvent mixtures comprising equal volumes of ethylene glycol, and other solvents. In each case the elution solvent, or solvent mixture, was employed in a proportion of 1 liter per 100 grams of adsorbate. A second series of elutions was carried out at a temperature of 100° C. The elevated-temperature elutions were effected in vessels provided with reflux condensers, and the mixtures were heated for 30 minutes, with intermittent mechanical agitation. In each case, at the conclusion of the elution the adsorbent was removed by filtration, and the resulting solution was assayed for flavin. The percentage elution, obtained in each case, is shown in the table below:

Table II

| Elution solvent | Per cent elution | |
|---|---|---|
| | Room temp. | 100° C. |
| 100% ethylene glycol | 85 | 90 |
| 50% ethylene glycol, 50% methanol | 79 | 96 |
| 50% ethylene glycol, 50% ethanol | 60 | 98 |
| 50% ethylene glycol, 50% butanol | 68 | 100 |
| 50% ethylene glycol, 50% acetone | 70 | 81 |

EXAMPLE III

The procedure of Example II was followed, utilizing polyhydric alcohols other than ethylene glycol. The following results were obtained:

Table III

| Elution solvent | Per cent elution | |
|---|---|---|
| | Room temp. | 100° C. |
| 100% propylene glycol | 8 | 27 |
| 50% propylene glycol, 50% methanol | 46 | 53 |
| 100% trimethylene glycol | 0 | 18 |
| 50% trimethylene glycol, 50% methanol | 35 | 32 |
| 100% glycerol | 7 | 55 |
| 50% glycerol, 50% methanol | 43 | 82 |

EXAMPLE IV

A fuller's earth adsorbate, prepared from a fermentation residue, was thoroughly washed with water, dried, and assayed for flavin. The essay showed that the adsorbate contained approximately 4,330 micrograms of flavin per gram. Separate portions of this adsorbate were eluted with the solvents shown in the table below, utilizing a proportion of 667 milliliters of solvent, per 100 grams of adsorbate. The elutions were effected at room temperature and at 100° C., following the procedure of Example II. The following results were obtained:

*Table IV*

| Elution solvent | Per cent elution | |
|---|---|---|
| | Room temp. | 100° C. |
| 100% monomethyl ether of ethylene glycol | 65 | 55 |
| 50% monomethyl ether of ethylene glycol, 50% water | 40 | 55 |
| 100% monoethyl ether of ethylene glycol | 5 | 4 |
| 50% monoethyl ether of ethylene glycol, 50% water | 10 | 38 |
| 100% diethylene glycol | 29 | 87 |
| 50% diethylene glycol, 50% water | 28 | 63 |
| 100% monomethyl ether of diethylene glycol | 52 | 73 |
| 50% monomethyl ether of diethylene glycol, 50% water | 51 | |
| 100% monoethyl ether of diethylene glycol | 45 | 75 |
| 50% monoethyl ether of diethylene glycol, 50% water | 29 | 71 |

It is to be understood, of course, that the above examples are merely illustrative, and do not limit the scope of my invention. Other elution solvents and solvent mixtures of the class previously described, may be substituted for those specifically illustrated in the examples. Likewise, the elution procedure may be varied in numerous respects, in accordance with prior practices in this art. It is also to be understood that my elution process may be used in conjunction with other elution procedures, or other methods of concentrating flavin, and that my process may precede, follow, or be used simultaneously with such other concentration procedures. In general it may be said that the use of any equivalents or modifications of procedure, which would naturally occur to those skilled in the art, is included in the scope of my invention.

The term "adsorbate" as used hereinabove and in the appended claims, refers to the adsorbent plus the adsorbed flavin.

My invention now having been described, what I claim is:

1. In a process for obtaining riboflavin concentrates of high potency from concentrated solutions thereof, the steps which comprise adsorbing the riboflavin from the solution on an inorganic adsorbent, separating the adsorbate from the body of the solution, and subjecting the said adsorbate to desorption with an agent containing as a major constituent, a hydroxy compound chosen from the class consisting of lower polyhydric alcohols and partially-etherified lower polyhydric alcohols.

2. In a process for obtaining riboflavin concentrates of high potency from concentrated solutions thereof, the steps which comprise adsorbing the riboflavin from the solution on fuller's earth, separating the adsorbate from the body of the solution, and subjecting the said adsorbate to desorption by means of thorough contact of the adsorbate with an agent containing as a major constituent, a hydroxy compound chosen from the class consisting of lower polyhydric alcohols and partially-etherified lower polyhydric alcohols.

3. In a process for obtaining riboflavin concentrates of high potency from concentrated solutions thereof, the steps which comprise adsorbing the riboflavin from the solution on an inorganic adsorbent, separating the adsorbate from the body of the solution, and subjecting the said adsorbate to desorption with an agent containing as a major constituent, a lower polyhydric alcohol of from 2 to 4 carbon atoms.

4. In a process for obtaining riboflavin concentrates of high potency from concentrated solutions thereof, the steps which comprise adsorbing the riboflavin from the solution on an inorganic adsorbent, separating the adsorbate from the body of the solution, and subjecting said adsorbate to desorption by means of thorough contact of the adsorbate with an agent containing ethylene glycol as a major constituent.

5. In a process for obtaining riboflavin concentrates of high potency from concentrated solutions thereof, the steps which comprise adsorbing the riboflavin from the solution on an inorganic adsorbent, and subjecting the said adsorbate to desorption by means of thorough contact of the adsorbate with an agent comprising essentially a lower polyhydric alcohol of from 2 to 4 carbon atoms, and water.

6. In a process for obtaining riboflavin concentrates of high potency from concentrated solutions thereof, the steps which comprise adsorbing the riboflavin from the solution on an inorganic adsorbent, separating the adsorbate from the body of the solution, and subjecting said adsorbate to desorption by means of thorough contact of the adsorbate with an agent comprising essentially a lower polyhydric alcohol of from 2 to 4 carbon atoms, and a lower monohydric alcohol.

7. In a process for obtaining riboflavin concentrates of high potency from concentrated solutions thereof, the steps which comprise adsorbing the riboflavin from a fermentation residue on fuller's earth, separating the adsorbate from the body of the solution, and subjecting the said adsorbate to desorption with an agent containing, as a major constituent, a hydroxy compound chosen from the class consisting of lower polyhydric alcohols, and partially-etherified lower polyhydric alcohols.

8. In a process for obtaining riboflavin concentrates of high potency from concentrated solutions thereof, the steps which comprise adsorbing the riboflavin from a fermentation residue on fuller's earth, separating the adsorbate from the body of the solution, and subjecting the said adsorbate to desorption with an agent containing, as a major constituent, a hydroxy compound chosen from the class consisting of lower polyhydric alcohols, and partially-etherified lower polyhydric alcohols, at a temperature between room temperature and 100° C., and separating the adsorbent from the riboflavin solution.

JULIAN K. DALE.